Jan. 3, 1928.

A. A. ROSENBLUM 1,654,897

APPARATUS FOR TESTING THE FERMENTATION OF DOUGH

Original Filed June 26, 1924    2 Sheets-Sheet 1

Inventor

Arthur A. Rosenblum

By Martin & Rendell

Attorneys

Jan. 3, 1928.  
A. A. ROSENBLUM  
1,654,897  
APPARATUS FOR TESTING THE FERMENTATION OF DOUGH  
Original Filed June 26, 1924  2 Sheets-Sheet 2
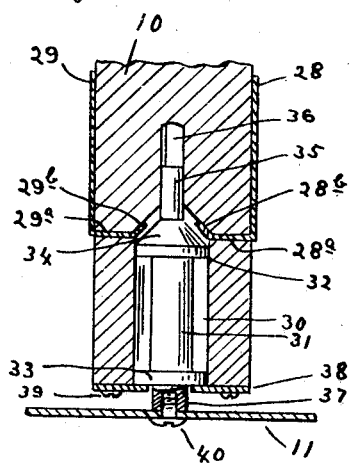
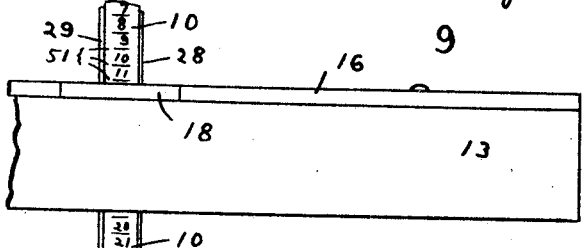
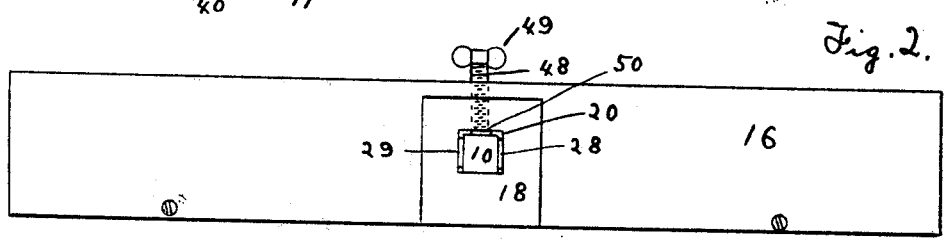
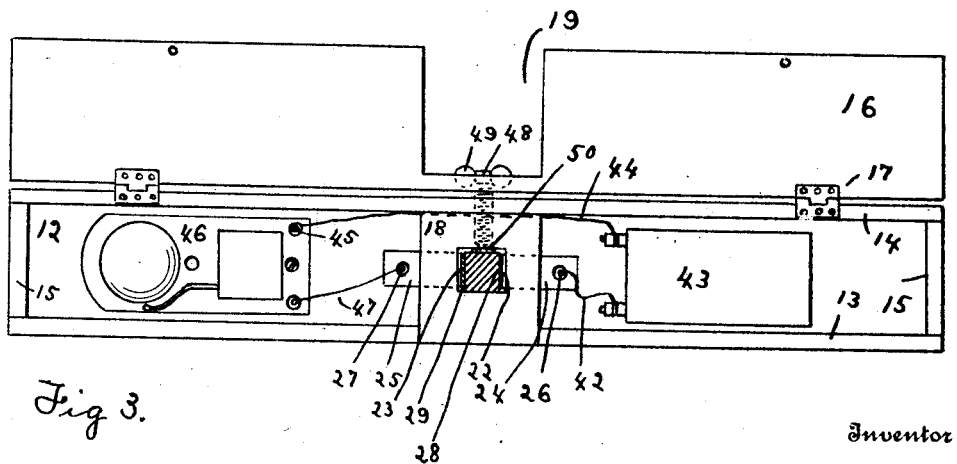
Inventor  
Arthur A. Rosenblum  
By Martin & Rendell  
Attorneys Patented Jan. 3, 1928.

1,654,897

UNITED STATES PATENT OFFICE.

ARTHUR A. ROSENBLUM, OF UTICA, NEW YORK.

APPARATUS FOR TESTING THE FERMENTATION OF DOUGH.

Application filed June 26, 1924, Serial No. 722,600. Renewed November 19, 1927.

My present invention relates to an apparatus for testing the fermentation of dough and which apparatus I have called a fermentometer.

The purpose of my invention is to provide an apparatus of the class described of improved, convenient and reliable form.

It is well recognized in the baking art that the rising of the dough through the process of fermentation is an operation that depends upon a great variety of elements including the character, relative quantity and particularly the temperature of the flour, shortening, water or other liquid and other incidental ingredients used in the making of the dough, the temperature of the receptacle or "trow" into which the dough is placed and the temperature or varying temperature of the room where the dough is located during the process of fermentation and the time during which the dough is left to rise and whether or not the dough is kneaded down or "knocked" down at the proper time after each successive period of fermentation. With a given known quantity and quality of ingredients the proper time for each step of fermentation will still be varied accordingly by a difference of a few degrees in temperature of some of the ingredients or of the whole mixture or through the atmosphere of the room rising or falling a few degrees in temperature during the process. It is known also that the dough should be kneaded down promptly after the proper expiration of time for each separate stage of fermentation in order to avoid spoiling the dough or running the risk of still greater variations in successive steps of the fermentation. To avoid these difficulties different tables have been prepared for the use of bakers which tables give the duration of time for each of the several steps of fermentation which times will vary according to the temperature of the dough and of the room during the process. Compliance with such tables is attended with difficulty and uncertainty due largely to the fact that the different mixtures may vary slightly in temperature at the beginning and also to the fact that the temperature of the room may readily increase or decrease due to weather or variances in the heating apparatus sufficiently during the several hours necessary for complete fermentation to entirely change the schedule which the baker is trying to follow.

It is the purpose of my invention to provide an apparatus which will overcome all of the above difficulties and uncertainties and enable the baker to determine and even be warned when a given mixture of dough has fermented or risen to the proper extent.

My apparatus is based upon and utilizes the principle that proper fermentation for the single step of fermentation if only one rising is used or for the different successive risings if the fermentation is carried on in several risings is determined by the ratio of expansion or in other words the ratio of the extent of increase in cubical contents of the dough. Working out this principle I have found that when dough has risen to the proper extent for any one step of fermentation it will have expanded in cubical contents to a definite amount or ratio and that when the dough has expanded to the proper extent the proper fermentation has taken place even though the fermentation may have occurred in appreciably less time than expected or may have required more time than expected. I have found also that this principle applies to the successful steps of fermentation usually used in a bake-shop for bread in that the dough at any given step should expand to a given proportion even though as is usually the case the proportions for the different steps of fermentation will vary greatly.

The apparatus embodying my invention, therefore, includes means for readily measuring the degree of expansion at each step of fermentation and giving an indication or warning to the baker of the completion of each fermentation step.

A further object of my invention is to provide a device of the character described which is adapted to be readily set to different positions for the different successive steps of the same mixture of dough and also an apparatus which can be readily adjusted for use with different sized batches of dough or different qualities of dough.

A further object is to provide an apparatus which is self-contained and sanitary so that the operation of the device will not be affected by moisture or the presence of flour or grease and which will have but a single readily cleaned portion that has to be brought into contact with the rising dough.

A further purpose is to provide in connection with a device of this character a means for indicating to or warning the baker that the dough has risen to the proper extent and preferably of having such signal an electric bell which bell and the battery for operating the same preferably will be entirely contained within the device.

A further purpose is to provide an arrangement in combination of the parts so that the electric connection brought into operation by the pressure from the dough will not be affected or disturbed by the adjusting of the standard at the different steps of fermentation or for different sized batches of dough.

Further purposes and advantages of my invention will appear from the specification and claims herein.

Fig. 2 is a top view of the apparatus.

Fig. 3 is a top view of the apparatus with the cover opened.

Fig. 4 is a side elevation of a portion of the bridge support and adjacent parts of the standard extending therethrough.

Fig. 5 is a vertical cross sectional view on an enlarged scale of the lower end of the standard and the yieldingly mounted foot mounted in its lower end.

Figure 1:
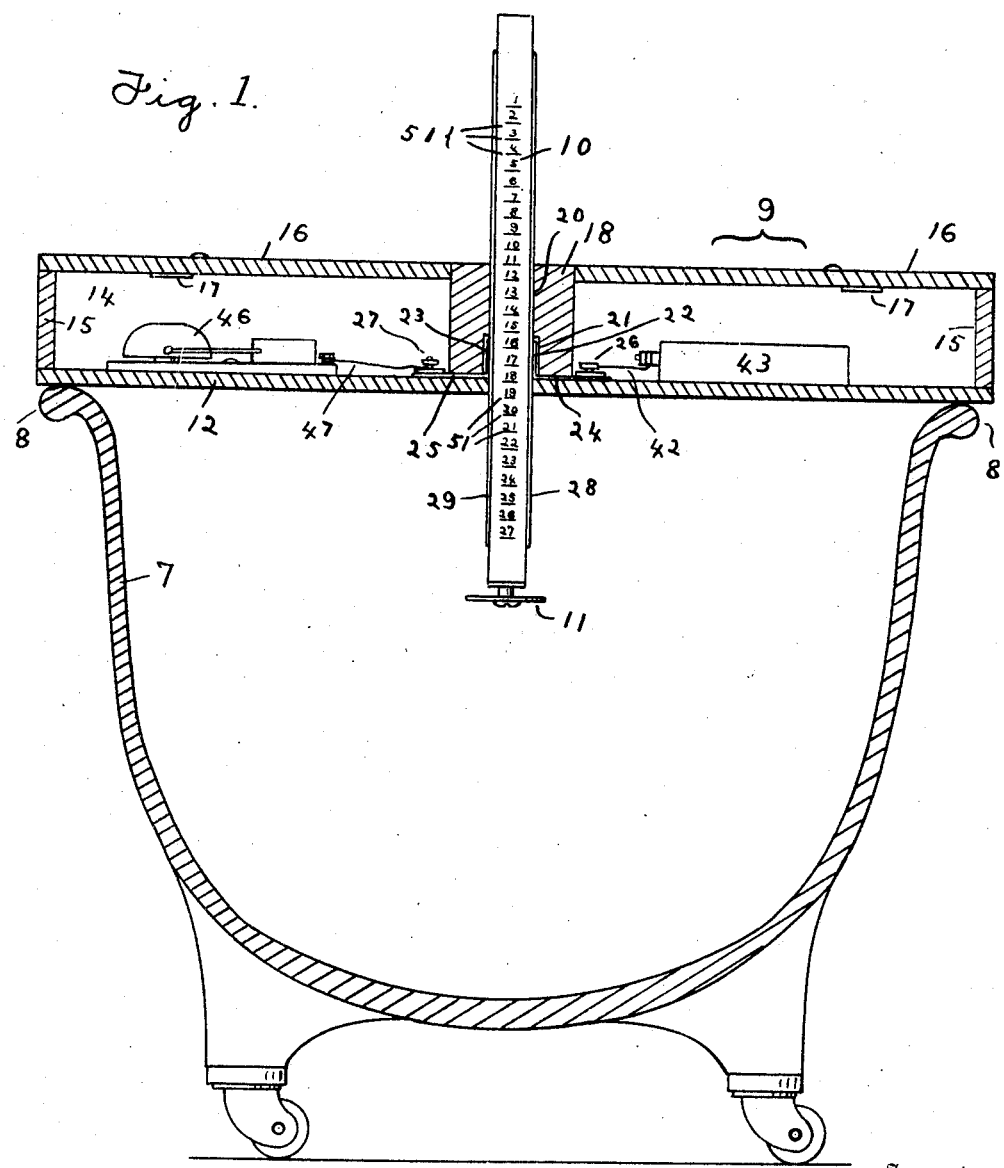
Fig. 1 is a vertical sectional view through a dough-containing receptacle and longitudinally through an apparatus embodying my invention in place upon said receptacle.

Referring to the drawings in a more particular description it will be seen that there is shown a receptacle 7 adapted to contain a batch of dough and which receptacle usually called in the art a "trow" is an open topped receptacle having at its opposite edges outstanding flanges 8. Upon the top of this receptacle is placed the bridge-like support 9 in which is slidingly mounted the standard 10 the bottom end of which depends from the bridge into the receptacle and at its lower extremity has supported therefrom the yieldingly mounted foot 11.

The bridge-like support 9 is preferably formed as shown in the drawings in the form of a box having a bottom 12, opposite sides 13 and 14, ends 15 and a top 16 forming a cover for said box hinged to said box as by hinges 17 towards the opposite ends of the box.

Rigidly secured at the center of said box is a block 18 extending from the bottom of the box to the level of the upper surface of the cover 16, the said cover being cut away from its side opposite the hinges to the line of the hinged side 14 forming a deep recess 19 as appears in the drawings. At the center of said block and vertically arranged through said block and extending also through the bottom 13 of the box there is provided an aperture 20 angular in form and preferably square as indicated in which aperture is slidingly mounted the upright standard 10.

Towards the bottom of the block 18 the aperture 20 is enlarged by pockets 21 on opposite sides of the block and preferably upon the sides of the block towards the end of the bridge-like support 9. Into these pockets 21 extend the upstanding ends 22 and 23 of electric circuit contact plates 24 and 25 respectively which plates extend out beneath the block 20 into the opposite compartments of the box 9 and there are provided with binding posts 26 and 27 respectively. On the sides of the standard 10 opposite the upturned ends 22 and 23 of the contact plates there are provided long contact plates 28 and 29 respectively which extend from a point near the top of the standard to a point approaching the lower end of said standard. From such lower points on the outside of the standard these contact plates have their lower ends 28$^a$ and 29$^a$ led in through openings made in the standard and then preferably turned upward at an angle forming contact fingers 28$^b$ and 29$^b$ respectively.

The contact fingers 28$^a$ and 29$^b$ just mentioned are located at the upper cone-shaped end of a cylindrical recess 30 extending upward from the lower end of the standard 10. In this cylindrical opening 30 is mounted a spool-like member 31 having flanges 32 and 33 at its upper and lower ends respectively with the upper flange 32 extended upwardly in a cone-shaped part 34 adapted when moved to upward position to engage the opposite upwardly and inwardly slanting fingers 28$^b$ and 29$^b$.

As a further aid for guiding the spool-like member 31 the cone-shaped part 34 has extending upward therefrom a stem 35 sliding in a correspondingly shaped upwardly extending pocket 36 in the standard. It will be understood of course that the cone-shaped part 34 is formed of a good conductor of electricity so that as the spool-like member or plunger 31 is shoved only a short distance upward an electric circuit is completed from the finger 28$^b$ through to the finger 29$^b$.

From below the lower flange 33 of the plunger 31 there extends downwardly a short shank 37. A plate 38 fastened as by screws 39 to the bottom end of the standard 10 permanently holds the spool-like plunger 31 in place, said plate being provided with a central aperture through which downwardly projects the shank 37. To the lower end of the shank 37 is fastened as by a screw 40 the relatively wide light disk-shaped foot 11 intended to be engaged and moved upward by the dough rising and pushing upward said foot.

To the binding post 26 upon the plate 24 is connected as by a wire 42 one post of battery 43. From the other post of said battery a wire 44 extends through the box to one post 45 of an electrically operated bell 46. The other post of this bell is connected through wire 47 to the binding post 27 on plate 25.

It will be understood that the upstanding ends 22 and 23 of contact plates 24 and 25 are formed of spring metal and so arranged as to spring towards each other and particularly into close contact with their respective long contact members 28 and 29 on the standard. The spring tension of the ends 22 and 23 is enough ordinarily to hold the standard 10 where placed but for certainty there is provided an additional means for holding the standard in the position to which it is set. This means includes a set screw 48 having ears 49 for its ready manipulation by hand. This screw projects through one side of the box and through a screw-threaded opening or bushing in the block 18 and has its inner end engage the adjacent surface of the standard 10 or preferably as shown in the drawings engage a thin strip of metal 50 rigidly secured to said surface of the standard. The object of the metal strip is to prevent the screw from forming holes in the wooden standard 10.

On one face of the upright 10 and preferably the surface away from the set-screw 48 there is provided upon the standard 10 a series of horizontally arranged marks 51 regularly spaced and numbered serially. This spacing may conveniently be at half inch distances and numbered serially from 1 progressively up with the number 1 arranged toward the top of the standard and the higher numbers extending down therefrom as more particularly appears in Fig. 1 of the drawing.

With a given size of receptacle and with a given composition and amount of dough an experienced baker through his judgment aided by careful experiments and observations of several batches of dough determines the extent of expansion of the dough that should be allowed for fermentation for the different steps of the process, the level of the dough at the start and at the completion of each step of fermentation being measured by the scale on the upright 10 assuming the foot 11 to be lowered against the dough and with the readings taken always at the same place preferably at the upper surface of the support 9.

Supposing that with a given batch of dough and given sized receptacle it is found that with the dough at 78° Fahrenheit and of an amount such that its level at the start would be indicated by the numeral 7 upon the scale the standard would be set to the number 14 on the scale. The dough would then be allowed to rise until it came up and by rising against the foot 11 operated the device to give a warning upon the bell. Under good conditions the schedule of time for this first rising of the dough would be one hundred minutes but varying conditions might make that time greater or less. The dough however, would be ready when it had risen and brought the device into operation.

After the dough had been punched down the standard would then ordinarily be adjusted at a higher level, namely at the numeral 18 on the scale. Ordinarily the dough by time schedules should then rise in forty-five minutes but when the dough had risen enough to operate the device the dough would be ready and would be punched down. Again, the standard would be set say at the numeral 16 for the last rising of the dough. The time schedule would give a period of ten minutes but the dough would be ready for its final knocking down process when the dough has risen to bring the machine into operation.

It will be understood that the suggestions of temperature and the points upon the scale as mentioned above are simply illustrative for a given batch under given conditions and that the device can be readily set at any desired elevation for the different steps of fermentation according to the experience or judgment of the baker and varying according to the different dough he is making.

The device operates to provide a ready way of gaging the extent of fermentation of the dough and provides means to give a signal when the dough has raised to the level at which the standard 10 has been placed.

It will be understood that one advantage of the device is that it provides means to warn the baker when the dough has risen sufficiently even though the conditions have changed so slightly that the baker himself may be unaware of the change. With the use of this device bread of great uniformity can be obtained. Heretofore it has been very difficult to attain such uniformity even after a baker had produced several batches of desired character of bread.

What I claim as new and desire to secure by Letters Patent is:

1. In an apparatus for testing the fermentation of dough in a receptacle, the combination of a support adapted to be positioned above the dough in a receptacle, a standard depending from and adjustable vertically thereto, a foot yieldingly mounted at the lower end of said standard and adapted to be engaged and moved by the rising dough, an electrically operated signaling device mounted on the support, leads extending from the signaling device to two sides of said standard, vertically extending contact plates on said sides of the standard whereby contact is maintained with said leads at any vertical adjustment of the standard and a circuit closing member connected to said movable foot and adapted on the upward movement of said foot to effect a contact with both said vertical plates.

2. In an apparatus for testing the fermentation of dough in a receptacle, the combination of a chambered support adapted to be positioned above the dough in a receptacle, a standard depending from and adjustable vertically thereto, a foot yieldingly mounted at the lower end of said standard and adapted to be engaged and moved by the rising dough, an electrically operated signaling device housed in the chamber of the support, leads extending from the signaling device to two sides of said standard, vertically extending contact plates on said sides of the standard whereby contact is maintained with said leads at any vertical adjustment of the standard and a circuit closing member connected to said movable foot and adapted on the upward movement of said foot to effect a contact with both said vertical plates.

3. In an apparatus for testing the fermentation of dough in a receptacle, the combination of a support adapted to be positioned above the dough in a receptacle, a standard depending from and adjustable vertically thereto, a foot yieldingly mounted at the lower end of said standard and adapted to be engaged and moved by the rising dough, an electrically operated signalling device mounted on the support, leads extending from the signalling device to two sides of said standard, vertically extending contact plates on said sides of the standard whereby contact is maintained with said leads at any vertical adjustment of the standard, connections from said plates to points within the standard and a circuit closing member connected to said movable foot and adapted on the upward movement of said foot to effect a contact with both said connections within the standard.

4. In an apparatus for testing the fermentation of dough in a receptacle, the combination of a support adapted to be positioned above the dough in a receptacle, a standard depending from and adjustable vertically thereto and having a closed chamber near its lower end, a foot yieldingly mounted at the lower end of said standard and adapted to be engaged and moved by the rising dough, an electrically operated signalling device mounted on the support, leads extending from the signalling device to two sides of said standard, vertically extending contact plates on said sides of the standard whereby contact is maintained with said leads at any vertical adjustment of the standard, connections from said plates to points within the said chamber and a circuit closing member connected to said movable foot and extending into said chamber and adapted on the upward movement of said foot to effect a contact with both said connections within the chamber.

In witness whereof I have affixed my signature, this 2nd day of June, 1924.

ARTHUR A. ROSENBLUM.